US005322143A

United States Patent [19]

Curran

[11] Patent Number: 5,322,143
[45] Date of Patent: Jun. 21, 1994

[54] VEHICLE LIFT AND LOCKING MECHANISM FOR USE THEREWITH

[75] Inventor: Robert J. Curran, Oakville, Canada

[73] Assignee: Wheeltronic, A Division of Derlan Manufacturing Inc., Mississauga, Canada

[21] Appl. No.: 993,555

[22] Filed: Dec. 21, 1992

[51] Int. Cl.[5] .......... B60S 13/00

[52] U.S. Cl. .......... 187/8.49; 187/8.71; 187/18; 254/122; 280/47.27

[58] Field of Search .......... 187/8.41, 8.47, 8.71, 187/8.72, 8.5, 8.49, 8.74, 8.75, 9 R; 254/122; 182/141; 280/47.24, 47.27, 47.17

[56] References Cited

U.S. PATENT DOCUMENTS

| | | | |
|---|---|---|---|
| 3,237,921 | 3/1966 | Jay | 187/18 |
| 4,221,280 | 9/1980 | Richards | 187/18 |
| 4,288,195 | 9/1981 | Brewer | 187/8.71 |
| 4,690,250 | 9/1987 | Bergstrom | 187/18 |
| 5,012,898 | 5/1991 | Tsymberov | 187/8.47 |

FOREIGN PATENT DOCUMENTS

| | | | |
|---|---|---|---|
| 275494 | 7/1988 | European Pat. Off. | 254/122 |

OTHER PUBLICATIONS

AMMCO-Model 2240-Low Rise Frame Contact Lift.
AMMCO-Model 2230-Multi-Purpose Lift.
ROTARY-The PAL7 For Here.-The MPAL8 To Go.
ROTARY-The PFX and PAL7 Do Wonders For Brake And Tire Work.

*Primary Examiner*—Kenneth W. Noland
*Attorney, Agent, or Firm*—Bereskin & Parr

[57] ABSTRACT

A vehicle lift has a support platform and a pair of scissor mechanisms underneath it for supporting it, and raising and lowering it. An actuator, for example, an hydraulic cylinder, that is connected between the scissor arms. The ends of one pair of scissor arms include rollers for engaging the ground, the rollers permitting the lift to be raised and lowered. A cart or other lifting device is provided for lifting one end of the lift, to support it on wheels of the cart. With the other end of the lift supported on the rollers of the scissor arms, the lift can be freely moved around on a flat surface. The lift can have a simple ratchet locking mechanism including a cam, which provides a simple mechanism for locking the lift in a raised position, and for enabling it to be lowered.

14 Claims, 8 Drawing Sheets

VEHICLE LIFT AND LOCKING MECHANISM FOR USE THEREWITH

This invention relates to lifts for vehicles, and more particularly, is concerned with hydraulic lifts for motor vehicles, including scissor mechanisms.

BACKGROUND OF THE INVENTION

At the present time, there are a large number of different types of hydraulic or other lifts available. Generally, these are designed within the constraints set by the design requirements of the lift, such as lifting capacity, lifting heights, and costs of materials and individual components. As such, conventional designs represent a compromise between these different requirements.

The assignee of the present invention has previously developed an hydraulic lift for motor vehicle, which includes two separate scissor mechanisms, each for one side of the lift (U.S. Pat. No. 4,724,930). Each scissor mechanism lifts a corresponding elongate wheel deck, intended to support the wheels on one side of the vehicle. Beneath each scissor mechanism, there is a base unit, on which rollers of the scissor mechanism run. This leaves a significant space between the two wheel decks, which is largely unobstructed. Each scissor mechanism and its associated wheel deck has a respective hydraulic cylinder for raising and lowering it. To ensure that the two wheel decks are maintained at the same height, there is a cross brace between them, and also the hydraulic circuit includes a valve arrangement, to ensure that the flows to and from the two hydraulic cylinders are essentially the same. Such a lift can be dimensioned to lift a vehicle to a considerable height.

Such a hydraulic lift has a number of advantages. However, it is relatively large, heavy and immobile.

In particular, the provision of the base units renders the lift suitable only for a fixed installation. The bases support and guide the scissor mechanisms. They also ensure that the load is distributed to the underlying floor, so that the floor need not be particularly flat or smooth.

Similarly, there are available a variety of lifts intended to lift a vehicle off its wheels, causing the vehicle to be supported directly at its body or chassis. To raise the deck, there are a number of vertical posts, fixed to the ground around the deck, for example, 2 or 4 posts. The assignee of the present invention has developed such a 2 post lift (U.S. Pat. No. 4,976,336). Then, some sort of a mechanism is provided within or associated with the posts, for raising the deck.

Like the foregoing lift based on a scissor mechanism, this suffers from the advantage that it is essentially large, cumbersome and fixed installation.

There are also available so-called low rise lifts. As compared to a full rise lift which can achieve a lift of 6 feet, a low rise lift may provide a lift in the range of the order of 23-28 inches. The intention is to raise a vehicle sufficiently high to facilitate work that really only requires exterior access, e.g. brake work requiring access to the wheel hubs. Low rise lifts would not be used for work requiring access to the underside of the vehicle.

However, low rise lifts known to the assignee of the present invention, suffer from a number of disadvantages. Firstly, the lifting range of such low rise lifts is usually inadequate. Thus, even at full height, they will leave the wheel hubs and the like of a vehicle at a height that is too low to be truly comfortable for a mechanic to work on the brakes, suspension, etc.

Secondly, to the assignee's knowledge, most such low rise lifts rely on a parallelogram mechanism. As such, the wheel deck is pivotally connected to the ends of two arms, forming two parallel sides of the parallelogram. The other, lower ends of the arms, are pivotally secured to the ground.

It will be appreciated that, in initial lifting, the two arms are essentially close to the horizontal. As such, the wheel decks are cantilevered away, either in front of or behind, the ground pivot supports for the arms. For this reason, it is essential that the arms be securely attached to the ground.

SUMMARY OF THE PRESENT INVENTION

Accordingly, it is desirable to provide a lift having a rise or lifting height which is greater than existing low rise lifts, but which need not be as high as conventional full rise lifts. Such lifts should preferably provide a lifting height of about 3 feet.

It is further desirable that such a lift should be simple, robust, and be capable of ready installation or removable. It is even more preferable that such a lift be capable of being readily moved at any time to a location within a workshop, or even outside, for use on any suitable flat, hard surface.

A further common problem with any lift arrangement is to provide a locking or safety mechanism to ensure that, once a vehicle has been raised, the lift can be locked, to prevent any accidental or unintentional collapse of the lift while a user is underneath it.

Another aspect of the present invention is directed towards a simple, robust and reliable locking mechanism.

In accordance with the first aspect of the present invention there is provided a lift for lifting a vehicle, the lift comprising: a support platform for supporting a vehicle; a pair of scissor mechanisms secured symmetrically beneath the support platform, each scissor mechanism comprising first and second scissor arms, which are pivotally connected generally at their mid points, with the first scissor arm having a first end for supporting the lift on the ground below one end of the support platform and including a roller at the other end thereof engaging and supporting the other end of the platform, and with one end of the second scissor arm being pivotally attached to the support platform at said one end thereof, and including, at the other end thereof, a ground engaging roller, each pair of the first scissor arms and of the second scissor arms being interconnected by cross bars to ensure that the scissor mechanisms operate in conjunction with one another; an actuator connected between the first scissor arms and the second scissor arms, for raising and lowering the lift; and lifting means for lifting the lift at said one end thereof, whereby the lift is supported on the ground-engaging rollers and by said means, for movement across a level support surface.

Preferably the lifting means comprises a cart with a main column having a handle at the upper end, and support wheels at the base of the main column, and a lever arm projecting out from the main column adjacent the wheels, for engaging and lifting the one end of the lift.

The lift can be configured to have a low profile, for example, of the order of $4\frac{3}{4}$ inches. For this purpose, a low profile actuator is required, and a hydraulic actuator is suitable. In such a case, the cart preferably includes a power unit for the hydraulic actuator. This can include an electric motor, a hydraulic pump and reservoir unit, and suitable hydraulic and electrical connection fittings.

In another aspect of the present invention, there is provided a ratchet mechanism for use in a vehicle lift, the ratchet mechanism comprising: a stop defining a stop face; a locking bar defining an abutment face and mounted for sliding movement relative to the stop member; guide means for maintaining the stop and the locking bar in alignment for relative sliding movement; a cam pivotally attached to the locking bar adjacent the abutment face thereof, the cam being configured so that: the cam can pivot and freely slide on the stop member while the locking bar is sliding across the stop member, in one direction; when the locking bar travels off the top surface of the stop member, the cam can freely pivot and remain on top of the top surface of the sliding member, to permit the abutment face and the stop face to contact one another after relative movement, in the other, opposite direction, to provide a locking action; and when the locking bar is further displaced away from the locking member in the one direction, the cam being capable of pivoting down between the abutment and stop faces, and providing an inclined surface relative to the stop face, to cause the locking bar to ride up over the stop member when the locking bar is moved in the other, opposite direction, to disengage the abutment and stop faces.

This ratchet mechanism is suitable for provision in any type of vehicle lift, and can provide a secure locking mechanism to ensure that a vehicle is securely held in an elevated position, even if the actuator or its power supply fails in some way.

BRIEF DESCRIPTION OF THE DRAWING FIGURES

For a better understanding of the present invention, and to show more clearly how it may be carried into effect, reference will now be made, by way of example, to the accompanying drawings, in which.

Figure 2:
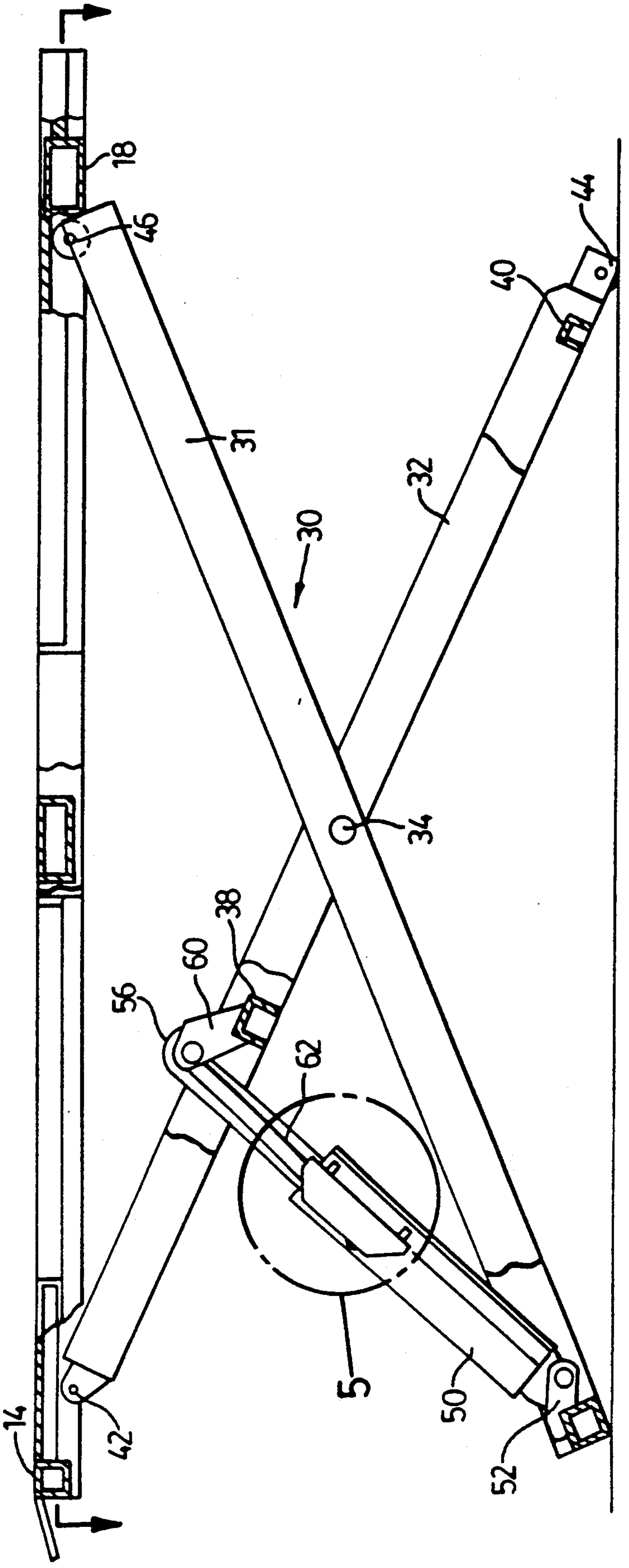
FIG. 2 is a side view of the vehicle lift of FIG. 1, showing the vehicle lift in a raised position, and with partial sections.
Figure 6:
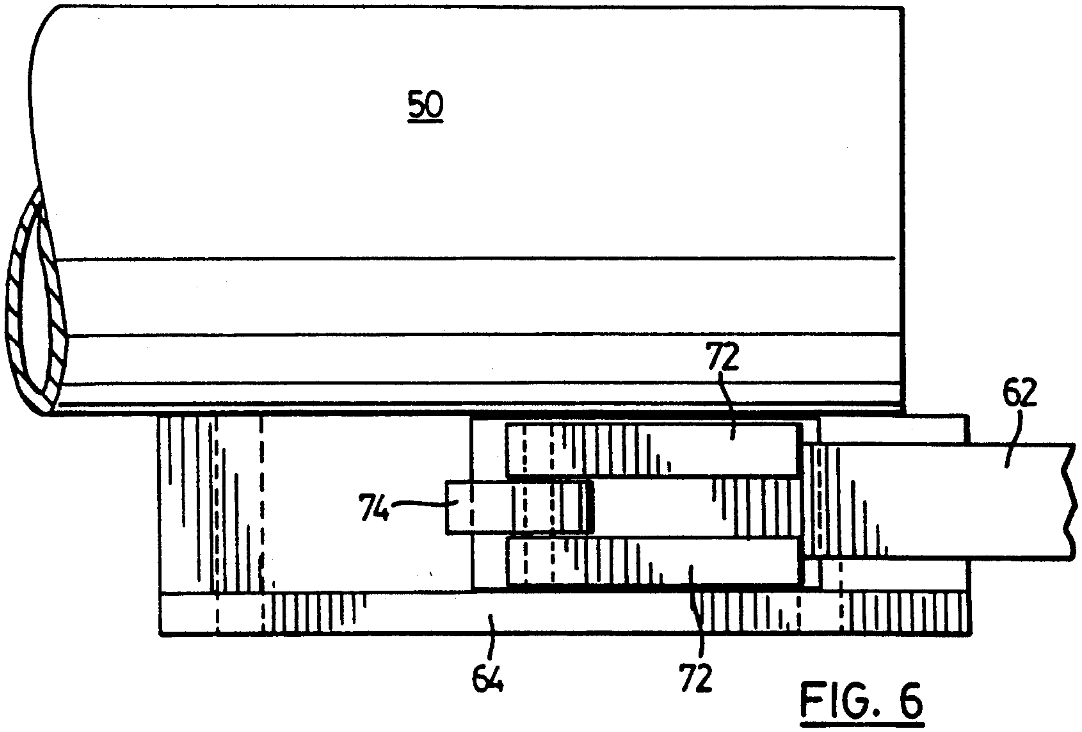
Figure 8:
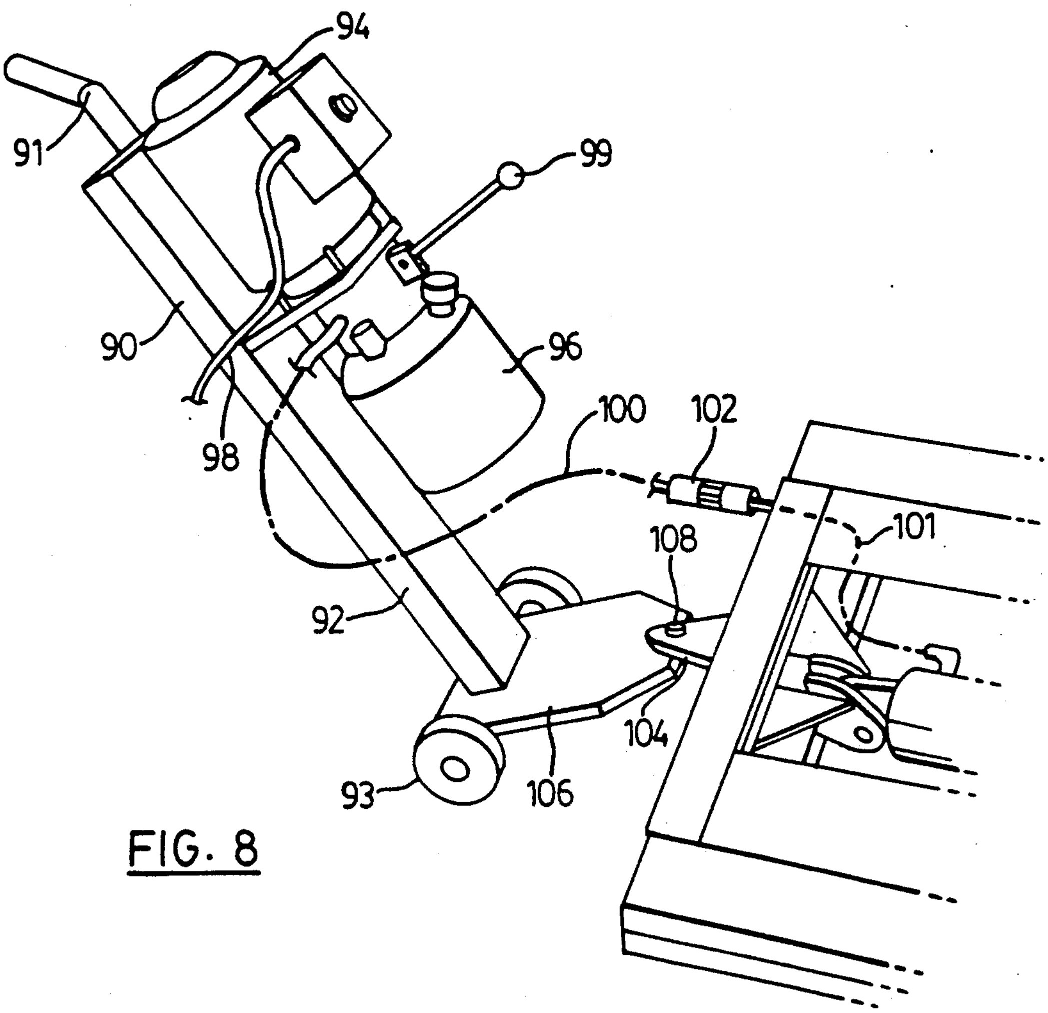
Figure 7A:
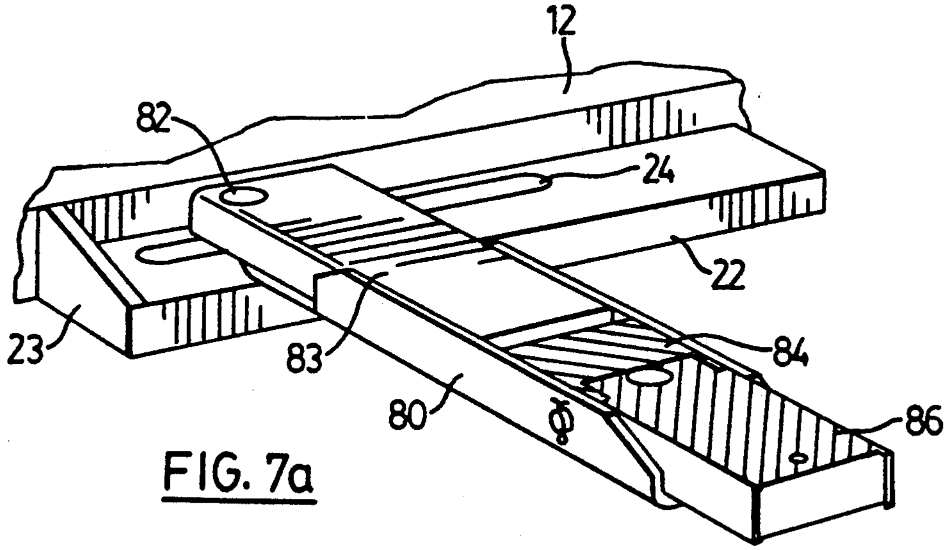
Figure 7B:
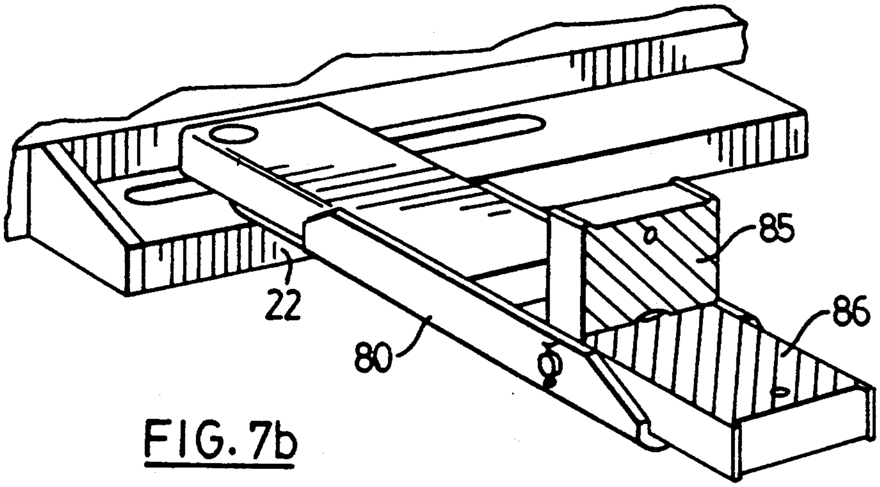
Figure 7C:
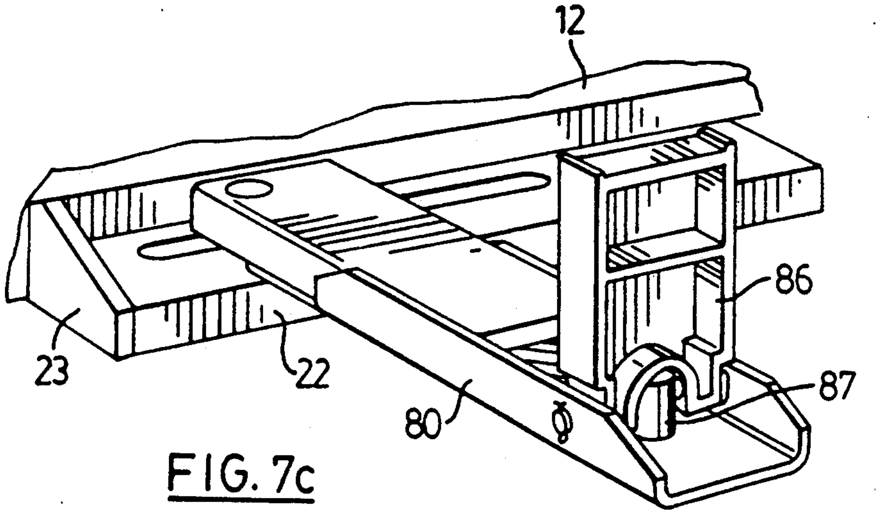

FIGS. 5*a*–5*f* are side views showing, on an enlarged scale detail 5 of FIG. 2, showing a locking mechanism;

FIG. 6 is a top view of a hydraulic cylinder and part of the locking mechanism;

FIG. 7*a*–7*c* are perspective views of the support arms of the vehicle lift showing vehicle support pads in different positions; and FIG. 8 is a perspective view showing an end of the vehicle lift and a power unit used in moving the lift.

DESCRIPTION OF THE PREFERRED EMBODIMENT

Figure 1:
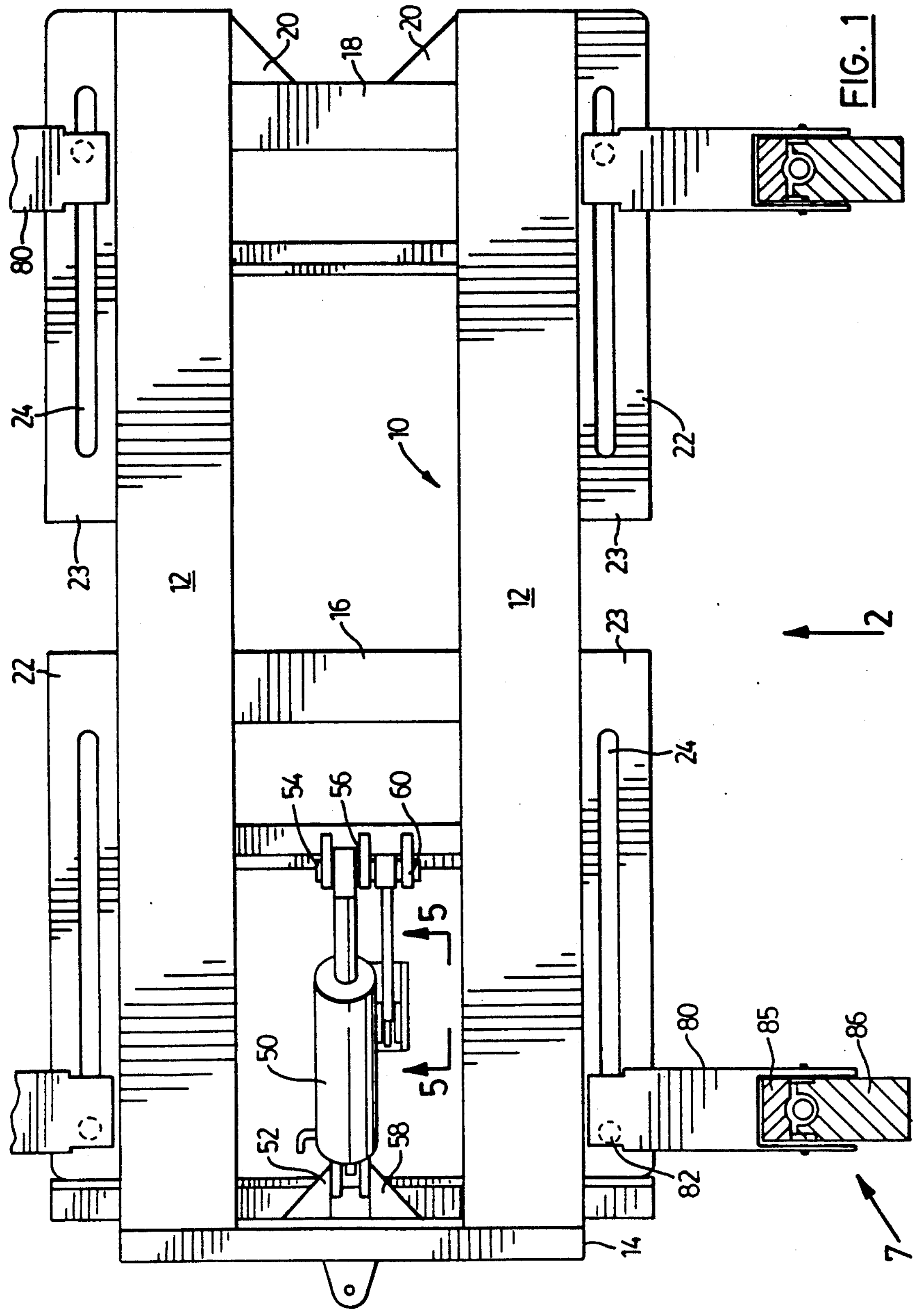
FIG. 1 is a plan view of a vehicle lift in accordance with the present invention.

Referring first to FIGS. 1 and 2, the top of the vehicle lift is provided with a vehicle support platform generally indicated by the reference 10. This platform 10 has two elongate longitudinal members 12, each of which comprises an inverted shallow U-shaped channel section. There are a number of transverse bridging bars or bracing elements, securing the two members 12 together, shown in the partial sections in FIG. 2. At one end, there is a square section tube 14, welded across the ends of the longitudinal members 12. At their mid points, the longitudinal members 12 have a rectangular section tube 16 joining them. At the other end, there is another rectangular section tube 18, provided with triangular gusset pieces 20 to brace the platform 10 as a whole.

As described in greater detail below, to provide mounting locations for support arms, four side elements 22 are provided. Each side element 22 is a solid piece of steel welded to the side of the respective longitudinal member 12, and includes an elongate slot 24. Gusset pieces 23 reinforce the side elements 22.

Figure 4:
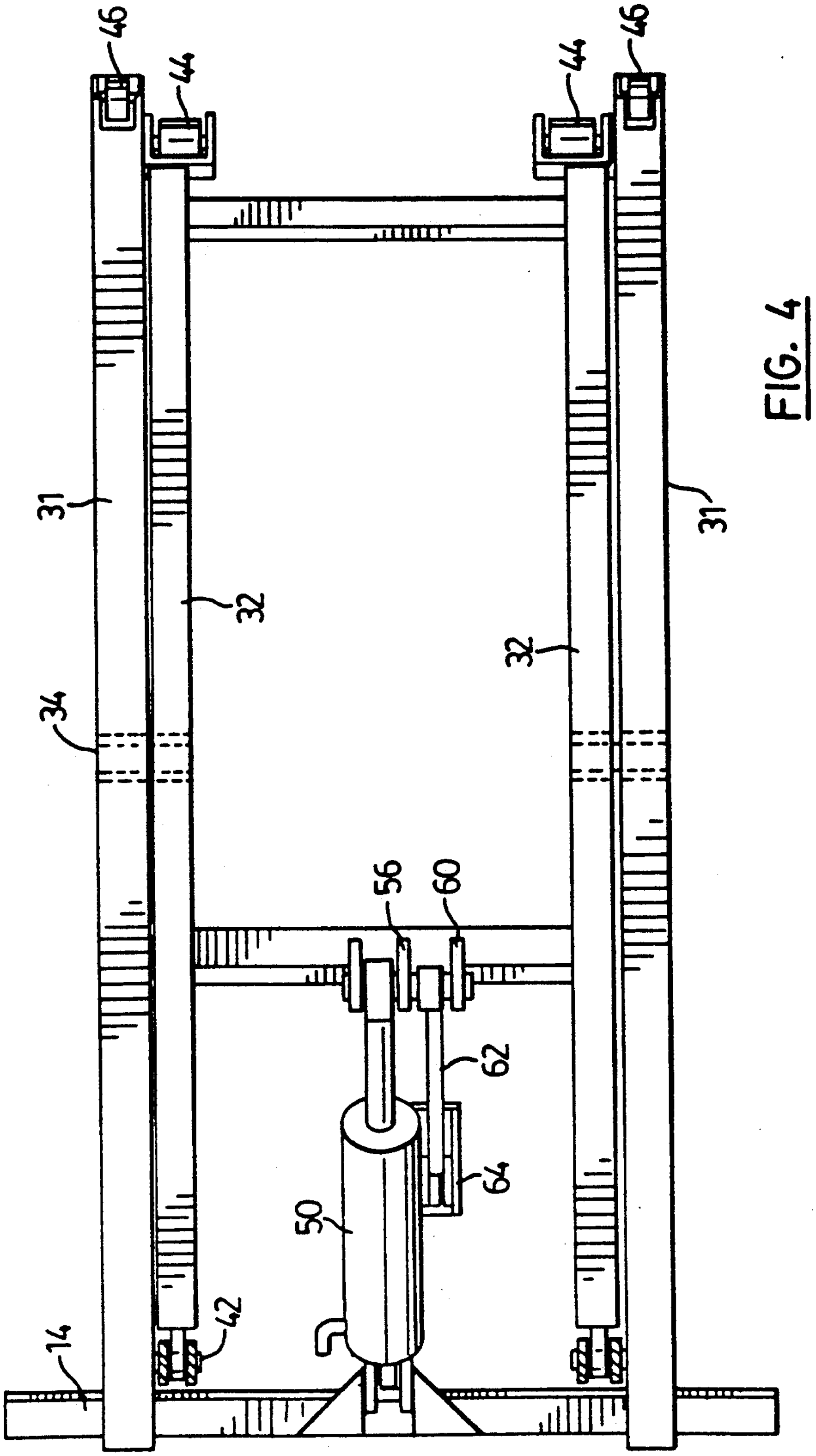
FIG. 4 is a plan view of the scissor mechanisms of the vehicle lift, with the vehicle support platform removed.

To support the vehicle support platform 10, and also to provide the mechanism for raising and lowering it, a pair of scissor mechanisms 30 are provided, which are substantially identical and symmetrical about a central vertical plane of the lift, as indicated in FIG. 4. Each scissor mechanism 30 comprises first and second scissor arms 31, 32, which are pivotally connected at 34.

At their lower ends, the two first scissor arms 31 are joined by a square cross tube 36, as shown at the lower left of FIG. 2; as further shown in FIG. 4, this tube 36 extends out to either side, to enhance the stability of the vehicle lift. The second scissor arms 32 are joined by an inverted U-section channel 38, towards their left end or upper ends, as viewed in FIG. 2, and by a small inverted U-section channel 40 at their other, lower ends. Each scissor arm 31, 32 is a rectangular section tube.

As shown in FIG. 2, the left hand ends of the scissor arms 32 are connected by pivots 42 to the longitudinal members 12. The other lower ends of the scissor arms 32 are provided with ground support rollers 44. Correspondingly, the right hand or upper ends of the first scissor arms 31, as viewed in FIG. 2, are provided with rollers 46, which engage the underside of the longitudinal members 12.

To raise and lower the vehicle lift, an hydraulic actuation cylinder 50 is pivotally connected at 52 by a short arm to the square cross tube 36, and at 54 to an extension arm 56 welded to the channel section 38. The connection 52 is provided with triangular bracing gussets 58, as shown in FIG. 1.

The embodiment shown has the first scissor arms 31 outside the second scissor arms 32. To space the rollers 44 further apart, to enhance stability, the arms could be reversed, with the first arms 31 inside the second arms 32. Then, the hydraulic cylinder would need to be moved to the right hand side of FIG. 2, to act between the right hand ends of the second arms 32 and a crossbar or channel, similar to U-channel 38, extending between the first scissor arms 31.

It should be noted that the pivot connection 52 is mounted as low as possible, while the extension arm 56 is dimensioned to raise the pivot connection 54, while maintaining this below the top surface of the vehicle lift. Similarly, the pivot at 34 is provided towards the lower sides of the arms 31, 32. This ensures that a line extending between the pivot connections 52, 54 is at a relatively large angle to a line extending between the pivot connections 52, 34. This in turn ensures that from a lowered position, the cylinder 50 has sufficient mechanical advantage to commence raising the lift. As the lift is progressively raised, the hydraulic cylinder 50 is acting at an increasingly more efficient angle.

Beside the extension arm 56, there is a second extension arm 60 for a locking mechanism. A locking bar 62 is pivotally connected to this. A U-shaped bracket 64 is welded to the side of the cylinder 50, as shown in detail in FIGS. 5 and 6. The bracket 64 is provided with support members 66. On the bottom of the bracket 64, which is generally flat, there is a rectangular stop member 68.

The free end of the locking bar 62 is provided with an inclined abutment face 70. On top of the locking bar 62, a pair of rectangular elements 72 are welded, and a cam 74 is pivotally mounted between them. The cam 74 has the rounded profile as shown in FIG. 5.

In use, when the lift is raised, the hydraulic cylinder extends causing the piston rod to travel as indicated by arrow 76. Consequently, the locking bar 62 slides through the U-shaped bracket 64, also in the direction indicated by the arrow 76 in FIG. 5*a*. The locking bar 62 has a lower surface facing a top surface of the stop member 68, for relative sliding movement. As this slides over the rectangular stop member 68, the cam 74 freely pivots out of the way, as indicated in FIG. 5*a*.

Figure 5B:
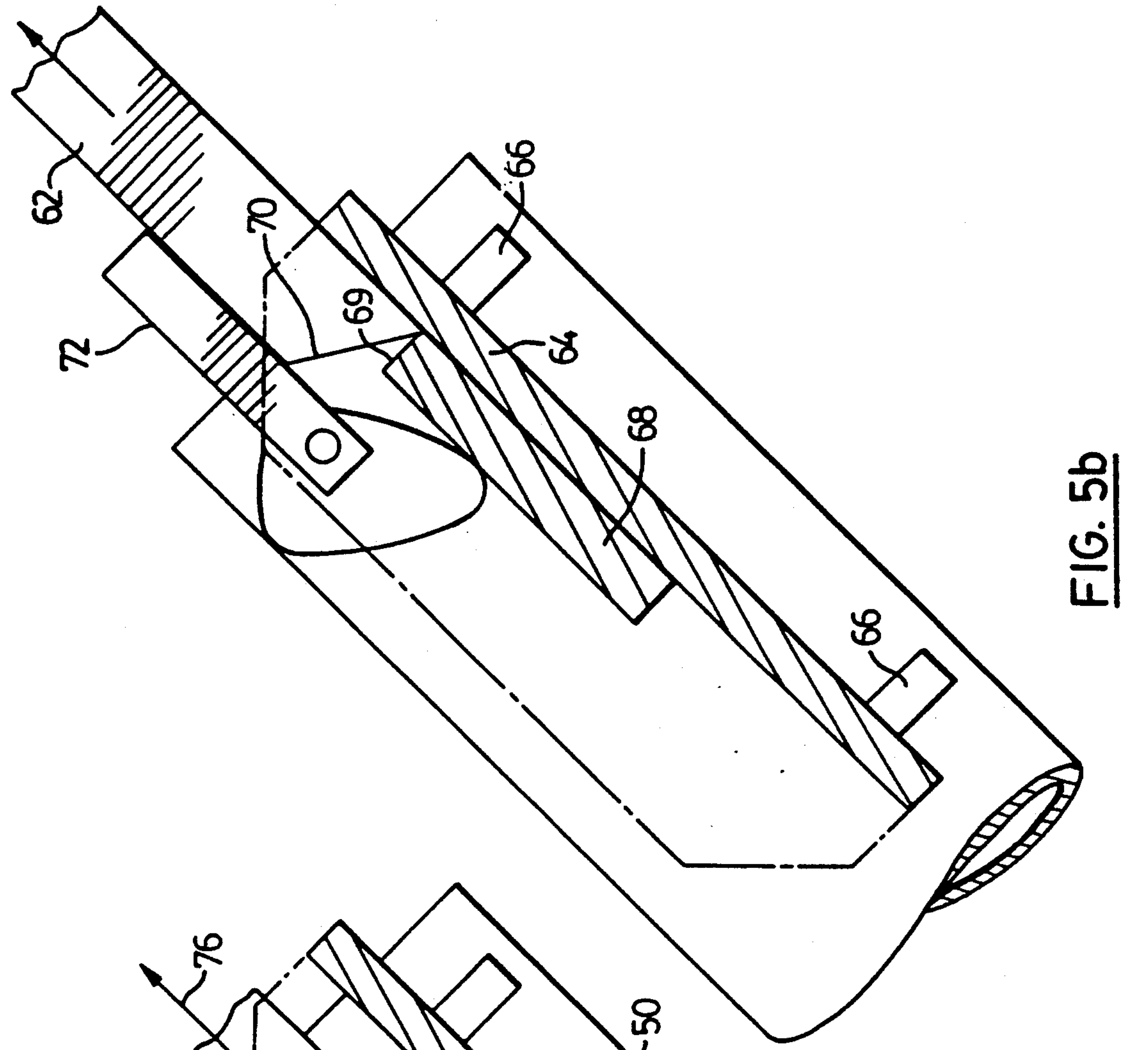
Figure 5A:
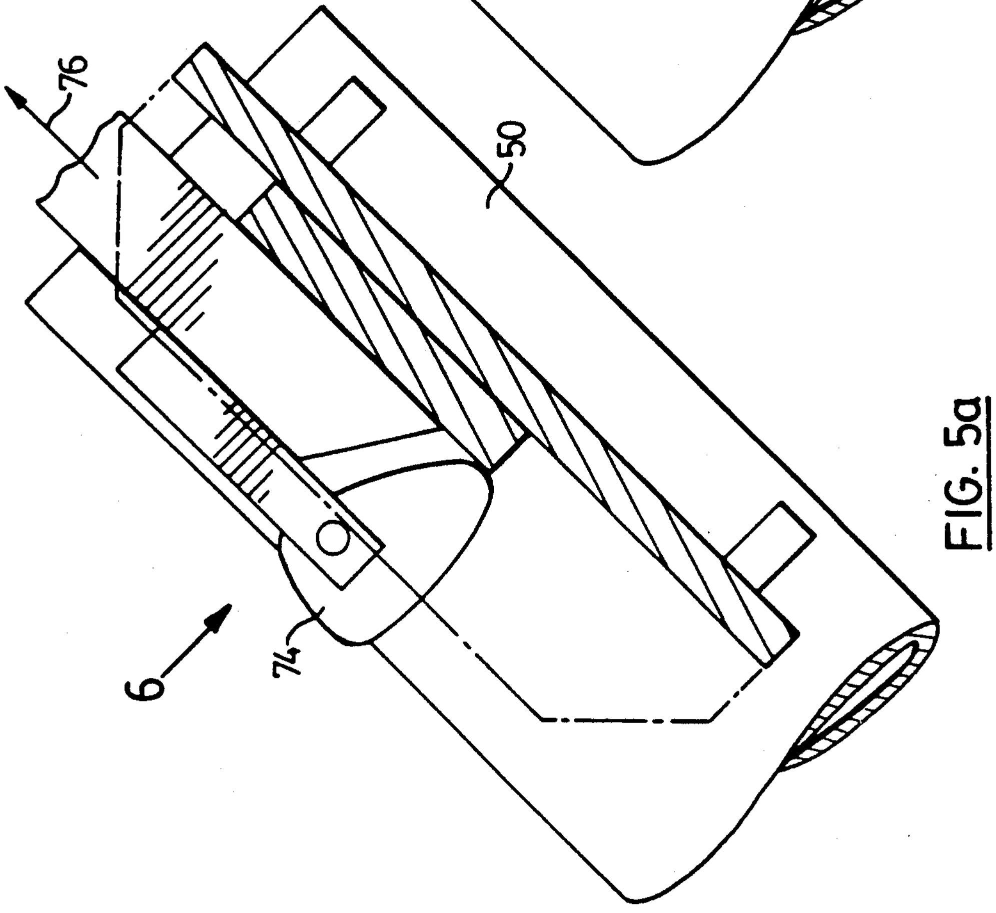

When the lift approaches its fully raised position, the locking bar 62 drops off the end of the rectangular stop member 68, as shown in FIG. 5*b*. Again, the cam 74 can freely pivot, to permit this action, as shown in FIG. 5*b*.

As the bar 62 drops down, this provides an audible sound to the user. The lower surface of the locking bar 62 then rests on an upper surface of the bracket 64. The operation of the hydraulic cylinder 50 can then be reversed slightly, to bring the abutment face 70 into contact with an end, stop face 69 of the stop member 68. This then locks the lift in the raised position and prevents it collapsing, even in the event of a major severance of the hydraulic supply line (FIG. 5*b*).

Figure 5D:
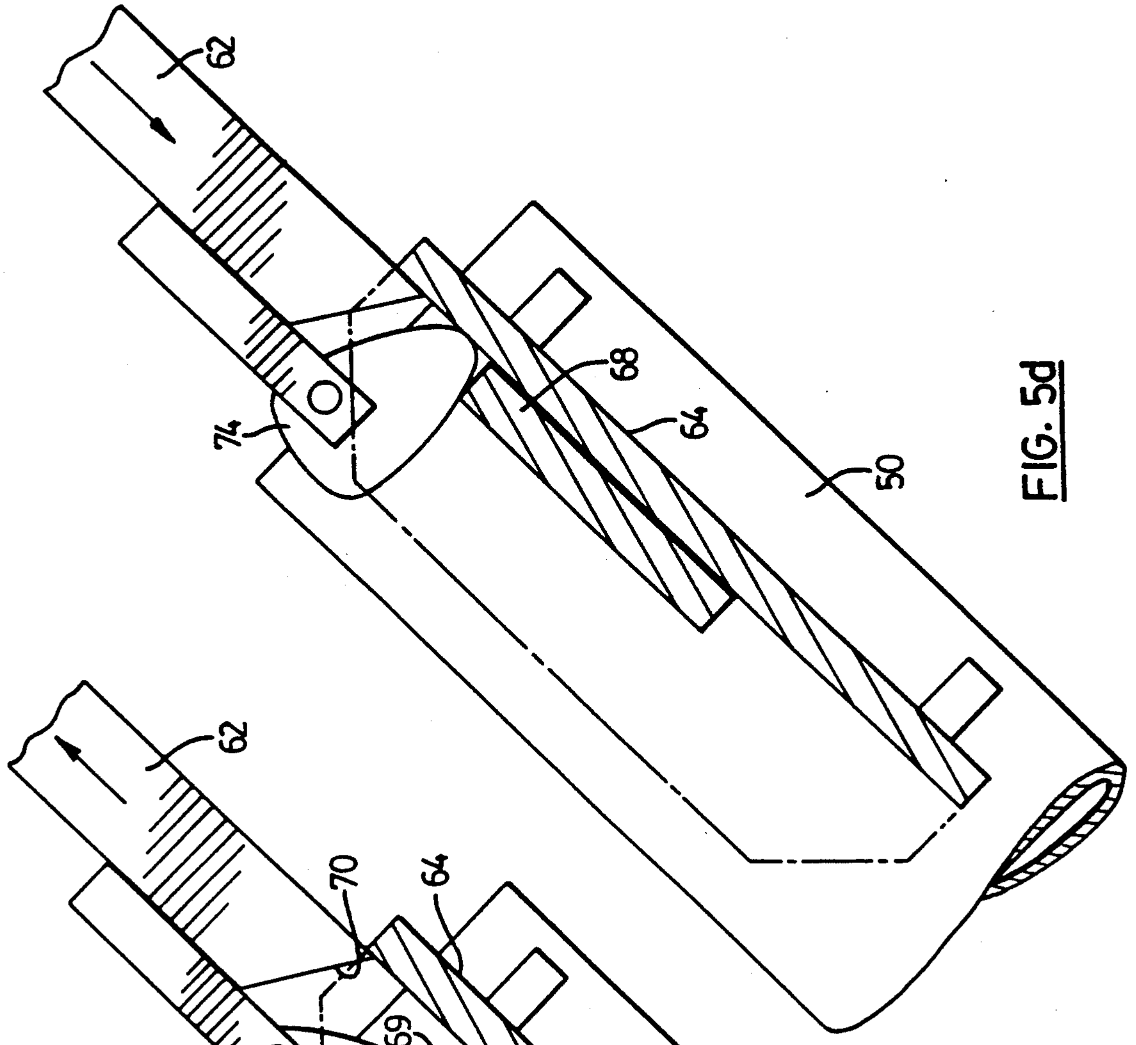
Figure 5C:
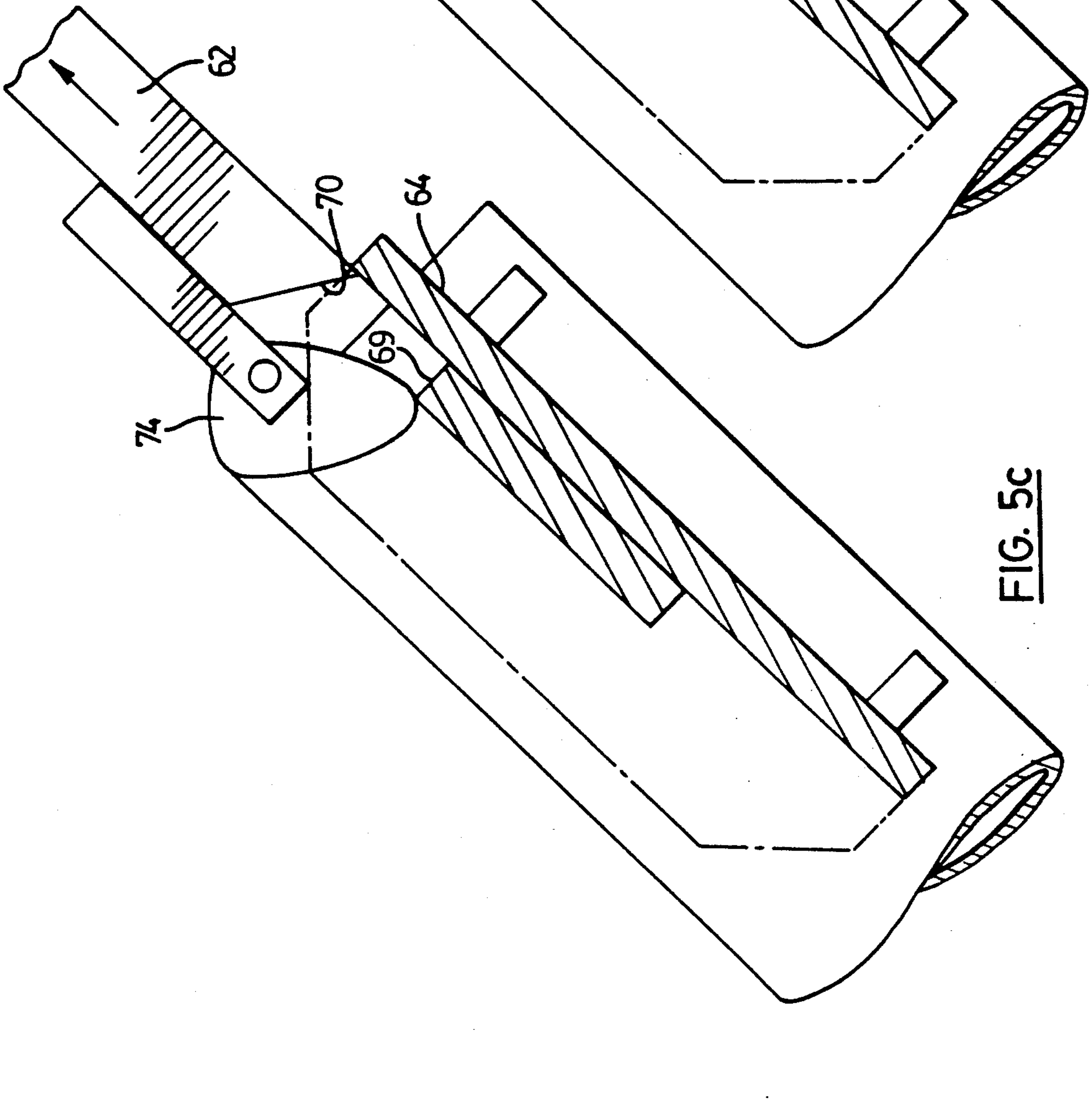

To lower the lift, it is first raised further from its locked position, as shown in FIG. 5*c*. The locking bar 62 is then pulled further away from the rectangular stop member 68; note that the bracket 64 is dimensioned so that, even at the fullest extent of the cylinder 50, the bar 62 cannot drop out of it.

As indicated in FIGS. 5*c* and 5*d*, this enables the cam 74 to drop down off the top of the rectangular stop 68. The cam 74 is pivotally mounted adjacent one side, so that its centre of gravity will be below the pivot point in the configuration of FIG. 5*d*.

Figures 5E, 5F:
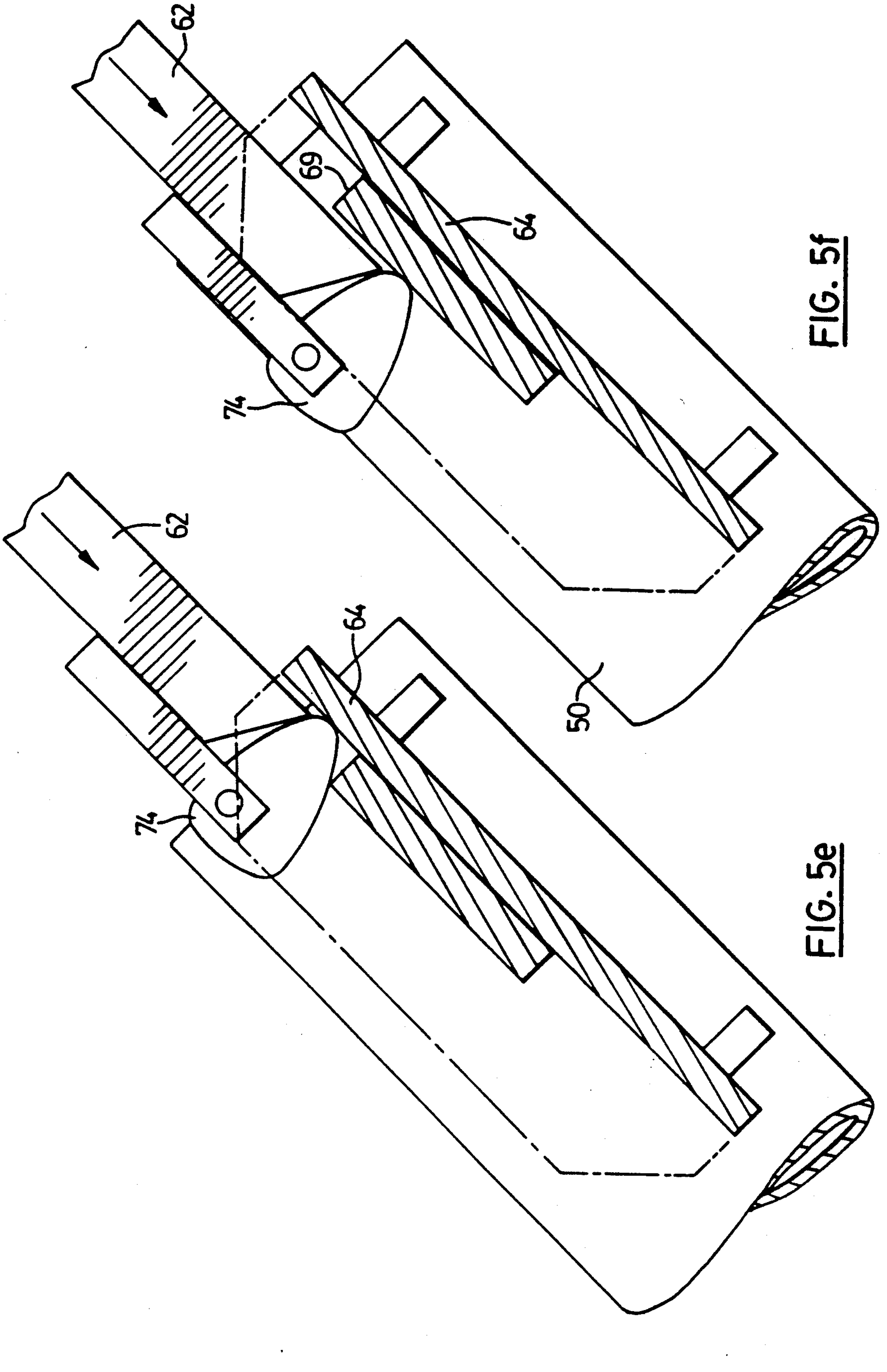

As indicated in FIGS. 5*d* and 5*e*, the hydraulic cylinder 50 is caused to retract, and the lift lowered; the locking bar then travels downwards, as indicated by the arrow 78. This causes the cam 74 to be pivoted until it comes into abutment with the abutment face 70 (FIG. 5*e*). It then presents an inclined cam surface to the stop face 69, inclined at an acute angle to the top surface of the stop member 68 which causes the cam 74 and hence the locking bar 62 to ride up on top of the rectangular stop 68 again. This is shown in FIG. 5*f*. For this purpose, the cam 74 can have any suitable curved profile for its left hand or lower face, as viewed in FIG. 5. With the locking bar 62 on top of the stop 68, the lift can be freely lowered to fully collapsed or lowered configuration.

Figure 3:
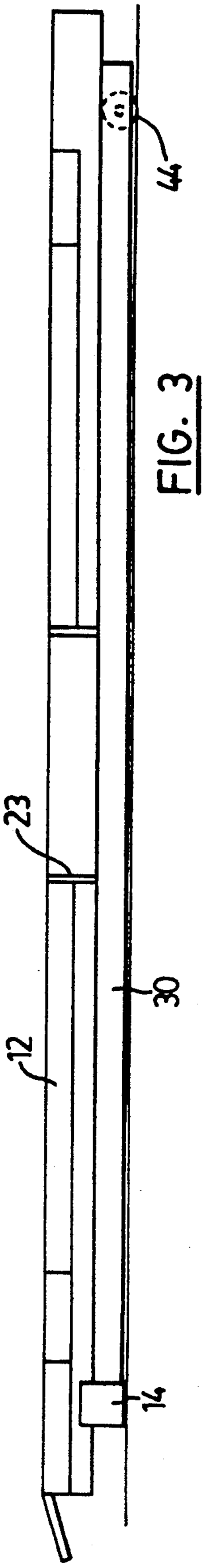
FIG. 3 is a side view of the vehicle lift in a lowered position.

In the collapsed configuration, the scissor arms 31, 32 are both generally parallel and close to the ground, and they are received within the inverted U-channel profile of the longitudinal members 12. As shown in FIG. 3, to accommodate the square bar 14, appropriate notches would be cut in the inverted channel members 12.

Referring to FIG. 7, this shows in greater detail the side elements 22 and support arms mounted on them. Each side element 22 is formed from solid one inch material, with elongate slots 24 having a width of 1¼ inch, and is flush with the bottom of its respective longitudinal member 12.

As shown in FIG. 7, support arms indicated at 80 are mounted by pivot pins 82 in these slots 24. In known manner, the pivot pins 82 are shaped to support a cantilevered load at the end of the support arms 80. Each support arm 80 comprises an inner solid bar section 83, and a channel section 84 welded thereto.

At the outer end of each arm 80, a pair of support pads 85, 86 are mounted within the channel section or slot as shown more clearly in FIG. 7*c*, a cylindrical mounting projection 87 is provided in the middle of the U channel 84, and a pivot pin 88 extends through this and through the support pads 85, 86 to secure them.

Turning now to FIG. 8, a power unit for the lift is indicated at 90. It has a main column 92, with a handle 91 at the top. The power unit has small wheels 93 at the bottom of the column 92, to form a small cart. It includes an electric motor 94, and a hydraulic pump and hydraulic reservoir indicated generally at 96. An electrical supply connection is indicated at 98, and this would be provided with a plug for connection to a conventional rib 110 volt A.C. outlet. An actuating lever is indicated at 99, which can be moved in either of two directions to raise and lower the lift. An hydraulic connection line is indicated schematically at 100, for connection to an hydraulic line 101 secured to the lift; in known manner, the two lines 100, 101 include complementary connection fittings, to form a suitable and separable hydraulic connection 102.

To enable the lift to be moved, the cross bar 14 is provided with a projecting tab 104. Correspondingly, a lever arm or base of the cart 90, indicated at 106, is provided with a pin 108 adapted to engage an aperture of the tab 104. As shown in FIGS. 2 and 3, the projecting tab 104 inclines downwardly at a slight angle.

In use, with the electrical supply line 98 disconnected and the hydraulic connection 102 separated, the power unit 90 can be brought up to the lift and the pin 108 engaged with the tab 104. Then, by pulling back and down on the handle 91, in known manner, the front of the lever 106 is raised. The tab 104 and hence that end of the lift are levered upwards off the ground, and are supported on the wheels 92 of the power unit 90. As the lift is supported at the other end on the ground support rollers 44, it can then be freely rolled about on any suitable hard, flat support surface. Thus, the concrete floor of most conventional repair shops would be suitable.

With the lift manoeuvred into an intended operating position, the one or tab end 104 of the lift can be dropped to the ground. The power unit 90 can then be detached from the tab 104, and located some suitable distance away from the side of the lift.

The hydraulic lines 100, 101 would then be connected with the hydraulic connection 102, and the electrical supply line 98 plugged into a suitable outlet.

A vehicle can then be driven over the lift, so that its wheels lie on either side. The support arms 80 can then be swung outwards and slid along the slots 24 so that the support pads 85, 86 are located at desired positions below jacking or support points of the vehicle body or chassis. Depending on the vehicle and the desired height that it has to be raised, different ones of the support pads 85, 86 can be used.

Thus, as indicated in FIG. 7*a*, the support pads 85, 86 can be left in a lowered position, giving no additional lifting range. For a first increase in the lifting height, the support pad 85 can be flipped up, as shown in FIG. 7*b*. Alternatively, for a greater increase in lifting height, and if there is sufficient space beneath the support point on the vehicle body, etc., the other support pad 86 could be flipped up as shown in FIG. 7*c*. The support pads 85, 86 are designed such that, when flipped up, they rotate slightly past a vertical position and rest against the other pad which is still lowered.

With the arms 80 and pads 85, 86 in the desired position, the hydraulic supply unit 96 would be actuated by the lever 99, to raise the lift. As indicated above, it would be raised until the locking bar 62 passes the stop 68, and then lowered slightly to the locked position of FIG. 5*b*. The necessary work can then be carried out on the vehicle. For example, the wheels can be removed and work carried out on the vehicle's brake or suspension systems.

In this regard, the scissor arms are preferably dimensioned to give a total lifting height of 32 inches. The support pads 85, 86 are dimensioned to increase this height to 34 and 37 inches respectively. This is noticeably higher than conventional low rise lifts, and should place vehicle brake and suspension systems at a comfortable height for maintenance and repair work to be effected.

With the work completed, the vehicle wheels would be replaced. As detailed above, the lift would then be raised an additional amount, to cause the locking mechanism to pass through the sequence of FIGS. 5*c*–5*f*. With the lift completely lowered, the vehicle can be driven away.

The lift is then ready for use with another vehicle. Alternatively, if it is desired to move the lift to another location, the power unit 90 can be detached, both electrically and hydraulically, and then used to move the lift, as detailed above.

By accommodating the scissor arms 31, 32 in the longitudinal members 12, and by locating the support arms 80 beside the platform 10, the overall profile can be kept low. The profile, in the collapsed position, can be kept to a height of 4¾ inches, which to applicant's knowledge, should not interfere with the chassis or suspension of any typical road vehicle.

While the lift is shown actuated by a hydraulic cylinder, a variety of different actuation devices could be used. For example, a pneumatic cylinder, connectible to a compressed air supply, may be acceptable for some cases, although generally, it would need to be of larger diameter.

I claim:

1. A lift for lifting a vehicle, the lift comprising:

a support platform for supporting a vehicle and comprising a pair of main longitudinal members, which are parallel and spaced apart, a plurality of first cross bars interconnecting the main longitudinal members, and side elements secured to outer side surfaces of the main longitudinal members, having a thickness less than that of the main longitudinal members and being generally flush with the bottom of the main longitudinal members, the side elements including elongate slots generally parallel with the main longitudinal members;

a pair of scissor mechanisms secured symmetrically beneath the support platform, each scissor mechanism being located under a respective main longitudinal member and comprising first and second scissor arms, which are pivotally connected generally at their mid points, with the first scissor arm having a first end for supporting the lift on the ground below one end of the support platform and including a roller at the other end thereof engaging and supporting the other end of the platform, and with one end of the second scissor arm being pivotally attached to the support platform at said one end thereof, and including, at the other end thereof, a ground engaging roller, a plurality of second cross bars interconnecting the first and second scissor arms to ensure that the scissor mechanisms operate in conjunction with one another;

support arms located above the side elements and pivotally attached in the slots thereof, the support arms being generally flush with the top of the main longitudinal members; and an actuator connected between the first scissor arms and the second scissor arms, for raising and lowering the lift.

2. A lift as claimed in claim 1, which includes lifting means for lifting the lift at said one end thereof and comprising a cart with a main column, having a handle at the upper end thereof, support wheels at the base of the main column, and a lever arm projecting out from the main column adjacent the wheels, for engaging and lifting said one end of the lift.

3. A lift as claimed in claim 2, wherein the actuator comprises an hydraulic actuator.

4. A lift as claimed in claim 2, wherein the cart includes a power unit for the hydraulic actuator.

5. A lift as claimed in claim 4, wherein the other end of the lift is provided with a supporting tab for engagement with the lever arm of the power unit, with the free end of the lever arm and the tab including complementary engagement elements.

6. A lift as claimed in claim 4 or 5, wherein the power unit includes an electric motor, an hydraulic pump and reservoir means connected to and driven by an electric motor, an electrical supply line connected to the electric motor, and adapted for connection to a conventional electrical receptacle, and an hydraulic connection line connected to the hydraulic pump and reservoir means, the hydraulic connection line including a connection fitting, and wherein the lift includes a corresponding hydraulic connection line having a connection fitting complementary to the connection fitting of the power unit, for connection thereto.

7. A lift as claimed in claim 3, 4 or 5, wherein the lift includes a central plane about which the lift is generally symmetrical, and wherein the hydraulic cylinder is pivotally connected between one second cross bar extending between the first scissor arms and another second cross bar extending between the second scissor arms, and lies generally in the central plane, the hydraulic actuator comprising an hydraulic cylinder and piston, each of which is pivotally connected to a respective cross bar, and which includes a locking mechanism comprising a stop member having a top surface, a locking bar and means for guiding the stop member and the locking bar for relative sliding movement, with one of the stop member and the locking bar being secured to the hydraulic cylinder, and the other of the stop member and the locking bar being secured to the second cross bar to which the piston is pivotally connected, with one of the stop member and the locking bar being pivotally secured, wherein the stop member defines a stop face and the locking bar defines an abutment face for abutment against that stop face to provide a locking action, and the locking bar includes a cam pivotally attached thereto adjacent the abutment face, the cam including a cam surface and being configured so that: the cam can pivot and freely slide on the top surface of the stop member while the locking bar is sliding across the stop member, in one direction; when the locking bar travels off the top surface of the stop member, the cam can freely pivot and remain on top of the top surface of the stop member, to permit the abutment face and the stop face to contact one another after relative movement, in the other, opposite direction, to provide a locking action; and when the locking bar is further displaced away from the locking member in the one direction, the cam being capable of pivoting down between the abutment and stop faces, so that the cam surface is inclined relative to the stop face, to cause the locking bar to ride up over the stop member when the locking bar is moved in the other, opposite direction, to disengage the abutment and stop faces.

8. An hydraulic lift as claimed in claim 1, wherein the longitudinal members have an inverted U-shaped channel section in which the scissor arms are located in a collapsed configuration.

9. A lift as claimed in claim 8, wherein the support arms include adjustable support pads, which can be adjusted to alter the effective height of free ends of the support arms.

10. A ratchet mechanism, for use in a vehicle lift, the ratchet mechanism comprising:

- a stop member defining a stop face and having a top surface;
- a locking bar defining an abutment face and mounted for sliding movement relative to the stop member;
- guide means for maintaining the stop member and the locking bar in alignment for relative sliding movement; a cam pivotally attached to the locking bar adjacent the abutment face thereof, the cam including a cam surface and being configured so that: the cam can pivot and freely slide on the top surface of the stop member while the locking bar is sliding across the stop member, in one direction; when the locking bar travels off the top surface of the stop member, the cam can freely pivot and remain on top of the top surface of the sliding member, to permit the abutment face and the stop face to contact one another after relative movement, in the other, opposite direction, to provide a locking action; and when the locking bar is further displaced away from the locking member in the one direction, the cam being capable of pivoting down between the abutment and stop faces, so that the cam surface is inclined relative to the stop face, to cause the locking bar to ride up over the stop member when the locking bar is moved in the other, opposite direction, to disengage the abutment and stop faces.

11. A ratchet mechanism as claimed in claim 10, in combination with a lift for a motor vehicle, which includes a first part that remains in contact with a ground, support surface, and a support platform for supporting a vehicle which is displaced vertically relative to the support surface, wherein one of the locking member and the locking bar is secured to the first part, and the other of the locking member and the locking bar is attached to the support platform.

12. A ratchet mechanism as claimed in claim 10, wherein the guide means comprises a support bracket, providing an upper slide surface for the locking bar, adjacent the stop member, and wherein the locking bar includes a lower surface, generally parallel to the top and upper surfaces, for sliding movement relative thereto.

13. A ratchet mechanism as claimed in claim 12, wherein the locking bar has an inclined abutment face, which forms an acute angle with the lower surface of the locking bar.

14. A ratchet mechanism as claimed in claim 12 or 13, wherein the cam includes a cam surface, which when the cam is brought into engagement with the top surface, for disengaging the abutment and stop faces, forms an acute angle with the top surface of the stop member, to cause the cam to ride up onto the top surface of the stop member.

* * * * *

UNITED STATES PATENT AND TRADEMARK OFFICE

CERTIFICATE OF CORRECTION

PATENT NO. : 5,322,143

DATED : June 21, 1994

INVENTOR(S) : Robert J. Curran

It is certified that error appears in the above-identified patent and that said Letters Patent is hereby corrected as shown below:

On the title page, insert item
--(30) Foreign Application Priority Date December 04, 1992
(CA) Canada.....2,084,561--

Signed and Sealed this

Twenty-seventh Day of September, 1994

Attest:

BRUCE LEHMAN

Attesting Officer

*Commissioner of Patents and Trademarks*